Feb. 27, 1934.  C. O. YOUNG ET AL  1,948,777
PROCESS OF SEPARATING HYDROCARBONS
Filed July 15, 1931
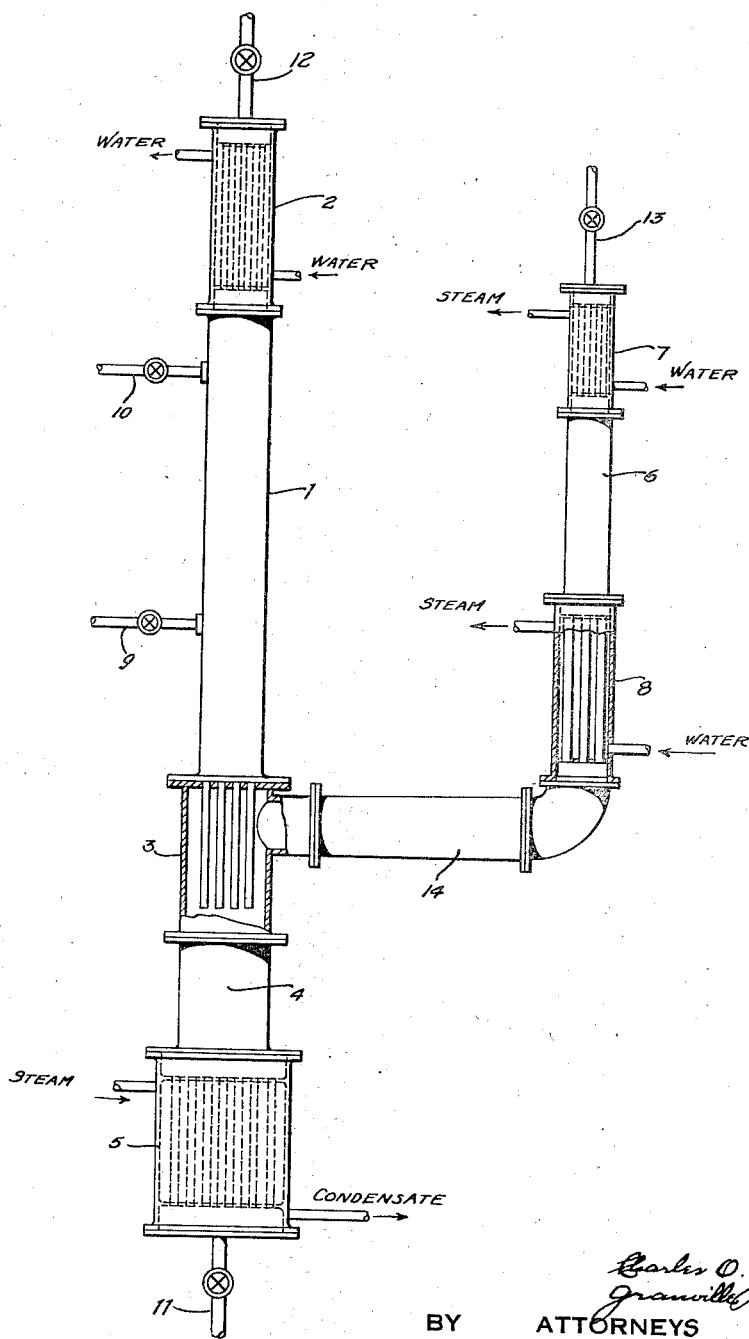

Patented Feb. 27, 1934

1,948,777

UNITED STATES PATENT OFFICE 1,948,777

PROCESS OF SEPARATING HYDROCARBONS

Charles O. Young, Charleston, and Granville A. Perkins, South Charleston, W. Va., assignors to Carbide & Carbon Chemicals Corporation, a corporation of New York Application July 15, 1931, Serial No. 551,005

9 Claims. (Cl. 202—40)

This invention relates to a process for separating and purifying diolefines, olefines and paraffins. The principal object of the invention is to provide an economical process for separating mixtures of diolefines, olefines and paraffins, which are not conveniently separated by ordinary fractional distillation. Another object is to provide a method for removing diolefines from hydrocarbon mixtures containing olefines as a step in processes which also include sulfating the olefines and preparing alcohols therefrom.

The difficulty of separating complex mixtures of hydrocarbons is well recognized, and ordinary methods of fractional distillation applied to products of the vapor phase cracking of petroleum or petroleum fractions, for example, usually effect only partial separation into fractions which have fairly constant boiling points, but which contain mixtures of diolefines, olefines and paraffins.

Special methods for the separation of diolefines have been proposed in British Patents 19,701 of 1909, 156,123, 319,025 and in U. S. Patent 1,782,906, involving the use of scrubbing agents such as alcohol, turpentine, acetic acid, acetone and sulfur dioxide, chilled wash oil, ethylene chlorhydrin, ethylene glycol monoacetate or diacetate, ethylene glycol monomethyl ether, glycerin di- or triacetate, lactic acid nitrile, diethyl tartarate, furfurol, or aromatic bases such as aniline, toluidine or phenylhydrazine. However, the separations obtainable by simple scrubbing operations are too incomplete to be of practical value. It has been proposed in British Patent 319,025 to repeat the scrubbing operation and to heat the resulting solution after each scrubbing operation in order to obtain pure diolefines. This process is of no practical value because of the large number of repeated heatings and coolings necessary for a complete separation.

A distillation method has been proposed in British Patent 324,350 in which certain relatively non-volatile substances, viz. ethylene chlorhydrin, ethylene glycol monoacetate or diacetate, ethylene glycol monomethyl ether, glycerin di- or triacetate, lactic acid nitrile, diethyl tartarate, furfurol, or aromatic bases such as aniline, toluidine, or phenylhydrazine, are added to the mixture to be separated, which is then distilled through a fractionating column. Since the relatively non-volatile substance does not enter the column in amounts sufficient to have an appreciable effect upon the separation in the column, this method is merely equivalent to a simple scrubbing of the mixture followed by heating the solution. Distillation methods which have been applied in similar cases include the addition of a volatile substance, chosen so that it forms ternary and binary constant boiling mixtures with certain of the substances which it is desired to separate. These latter methods involve difficulties in recovering the added volatile substances, and usually separate only one constituent in a pure form, leaving the other in an azeotropic mixture.

We have found that economical separations of diolefine, olefine and paraffin hydrocarbons having similar boiling points can be attained by means of suitable solvents used in a manner not heretofore applied to this problem. In general, our process comprises fractionally distilling the mixture to be separated in a still and in the presence of a suitable solvent, the solvent being continuously introduced, in liquid form, into the column of the still. A suitable solvent is one which selectively dissolves diolefines, does not form azeotropic mixtures with the hydrocarbons to be separated, and is stable on continued boiling at the desired pressure. The selective solubility may be easily determined by an arbitrary test. The test which we use consists in determining the boiling points of mixtures of 10 grams of the proposed solvent with 1 gram of n-butane and of 10 grams of the proposed solvent with 1 gram of butadiene. If the boiling point of the latter mixture is 10° C. higher than the former, the solvent is sufficiently selective to be used in our process, but a difference of 20° C. or more is preferable. Solvents which when tested as described, produce a difference in the boiling points of about 10° C. or more will be hereinafter designated as selective. In general, liquids which are completely miscible with non-paraffin hydrocarbons, (e. g. with benzene) and with water are found to be selective. Among such solvents, 1,4-dioxane is preferred for the separation of hydrocarbons which boil at about $-10°$ to $+70°$ C. at atmospheric pressure. Certain other substances, such as bis-beta-chloroethyl ether, nitrobenzene, aniline, and ethylene dichloride, are also selective but they are not completely miscible with water. The pressure at which the process is to be conducted depends upon the hydrocarbons. A convenient pressure, whether super-atmospheric, atmospheric, or sub-atmospheric, is usually the pressure at which the hydrocarbons boil at about 40° C.

The invention is illustrated by the following description of a preferred embodiment of our process, as applied to the separation of butadiene, butylenes, and paraffins from a mixture containing butadiene, butene-1, butene-2, iso-butylene, n-butane and isobutane, and which employs 1,4-dioxane as the solvent.

The system used in carrying out this form of the process is diagrammatically shown in the accompanying drawing, in which a column 1, of either tray-containing or packed type, such as is commonly used in continuous distillation is connected at its upper end to a partial condenser or dephlegmator 2, and its lower end to a hydrocarbon boiling section 3, constructed like an ordinary tube condenser with the omission of a lower tube sheet. A tray-containing or packed section 4 connects section 3 with a kettle 5. A tray-containing or packed section may be used in place of section 3. The purpose of the peculiar construction of the section 3 is to provide a completely countercurrent flow of liquid and vapor in the section where the major part of the hydrocarbon boiling occurs. A similar tray-containing or packed auxiliary column 6, with dephlegmators 7 and 8 at its top and bottom, is connected to the hydrocarbon boiling section 3 by a liquid and vapor connection 14.

The hydrocarbon mixture is admitted in liquid form to the column 1, by means of a feed pipe 9 at a point where the composition of the hydrocarbon portion of the refluxing liquid is found to be similar to that of the feed. Liquid 1,4-dioxane is continuously supplied to the column 1, by means of a pipe 10 at a point above the feed pipe 9, and sufficiently below the dephlegmator 2, so that no dioxane vapor will pass through the dephlegmator 2. The separated components are removed by pipes 12 and 13 from the dephlegmators 2 and 7 respectively. We prefer to operate the system at a gauge pressure of about 50 pounds per square inch in order that the hydrocarbons may be condensed without the use of refrigeration. The kettle 5 is suitably heated to a temperature such that the vapor reaching the dephlegmator 8 has a temperature above 100° C. Pure dioxane collects in the kettle 5 and is continuously drawn off through a pipe 11 to be cooled and recirculated in the column through the pipe 10.

The hot vapors outside of the tubes in the hydrocarbon boiling section 3 boil most of the hydrocarbons out of the liquid flowing down the tubes, and the hydrocarbon vapors pass up the column 1 in contact with and countercurrent to the reflux liquid which is a solution of hydrocarbons in dioxane. The vapors do not necessarily become continuously cooler in passing up the column 1 as in ordinary fractional distillation, in fact, they may become warmer as they rise through the column 1 between the hydrocarbon boiling section 3 and the dioxane inlet 10. We have found that the composition of the vapors continually changes as they rise through the column 1. The diolefines tend to concentrate at the lower end of the column 1, that is, at the hydrocarbon boiling section 3, and the paraffins tend to concentrate at the top of the column 1. The olefines may be concentrated toward either the top or bottom of the column 1 depending upon the relative amounts of vapors allowed to escape through the pipes 12 and 13.

The hydrocarbon vapor which has arisen through the column 1 is freed from dioxane vapor in the short section of the column 1 above the dioxane feed pipe 10, and is partially refluxed in the dephlegmator 2. The portion of the hydrocarbon vapor which is not refluxed, but which is drawn off through the pipe 12 into a condenser and receiver or other suitable apparatus (not shown) will be referred to as the heads-cut.

A portion of the hydrocarbon remains in the liquid dioxane as it flows down the column 1, and passes out of the column 1 and through the hydrocarbon boiling section 3 in liquid condition. It is finally vaporized in the section 4. This vapor, mixed with a larger amount of dioxane vapor, passes through connection 14 to the dephlegmator 8 where most of the dioxane is refluxed. The greater portion of this hydrocarbon vapor passes up the auxiliary column 6, being therein freed from dioxane, and passes out of the apparatus through the dephlegmator 7 and the pipe 13. This hydrocarbon portion will be referred to as the tails-cut, since it is derived from the bottom of the main column 1.

The proportion of heads and tails-cut is regulated by controlling the flow from the outlet pipes 12 and 13. We prefer to control the flow from the pipes 12 and 13 so as to give products of the desired composition as determined by known tests, of which the hydrometer test for specific gravity is convenient for immediate control purposes. The control of a large column capable of producing pure heads and tails components simultaneously is preferably aided by hydrometer tests of sample material continuously taken from and returned to the central portion of the column 1.

Using an apparatus as described above, the main column of which was 28 ft. long and filled with 8 to 10 mm. glass rings, we were able to separate a mixture of four carbon atom hydrocarbons containing about 50% paraffins into a heads-cut containing 98% paraffins and a tails-cut containing 6% paraffins. The column temperature above the feed pipe 9 was 80° C. at 40 lbs. pressure, indicating that the proportion of hydrocarbon to dioxane in the reflux of liquid was about 1:25. Higher ratios are less effective in the separation of n-butane from isobutylene and butene-1, as is indicated by the fact that a 1:10 mixture of n-butane with dioxane boils at 21° C., whereas a corresponding mixture of isobutylene and dioxane boils at 23° C., both at atmospheric pressure. If a high ratio of hydrocarbon is used, that is, if little or no dioxane is circulated, the n-butane tends to concentrate in the tails instead of in the heads because of its relatively high boiling point in the absence of a solvent.

In the separation of butadiene from butylene we prefer to use a hydrocarbon to dioxane ratio of from 1:5 to 1:10, and with a 28 ft. column we were able to obtain a heads-cut containing 0.2% of butadiene with a tails-cut of about 70% butadiene, or a heads-cut containing about 70% butylenes with a tails-cut containing less than 1.0% butylenes. The most difficult separation herein involved is that of butene-2 from butadiene. This is evidenced by the fact that at atmospheric pressure, butene-2 boils at 35° C. when dissolved in 10 parts of dioxane and butadiene boils at 40° C. under the same conditions. If a small amount of butene-2 remains in the butadiene obtained by our process it may be removed by ordinary fractional distillation, since butene-2 boils at a temperature 6° C. higher than butadiene in the absence of a solvent.

The separations described above are merely examples of the results of single passes through a particular column. Products of any desirable degree of purity may be obtained by repassing material through the column, or by the use of a longer column. Modifications of the apparatus are also possible in which the tails-cut is not removed from the main column in vapor form, but is allowed to escape from the bottom of the kettle dissolved in the solvent, and is subsequently separated from the solvent in an independently operated column.

The process has been described with reference to the separation of a mixture of four carbon atoms hydrocarbons. Also it may be applied to any other mixture of diolefines, olefines and paraffins, or of any two of these in which the boiling point of the constituents are not widely separated. For example, the process may be applied to the separation of isoprene, olefines and paraffins from a fraction of cracked hydrocarbons boiling at about 35° C. The selective solvent in each case tends to concentrate the diolefines in the tails-cut and the paraffins in the heads-cut, whereas its effect upon olefines is intermediate.

Our process is particularly applicable for preparing olefine-containing hydrocarbons free from diolefines, and, if desired, from paraffins, for use in sulfating processes to make alcohols. It is also adapted to many other uses, such as preparing pure diolefine, olifine or paraffin hydrocarbons. Many modifications of our process will be apparent and are included within the invention as defined in the appended claims.

We claim:

1. A process for separating and recovering diolefine, olefine, and paraffin hydrocarbons from a mixture of hydrocarbons having similar boiling points, which comprises distilling the mixture through a fractionating column down which a liquid organic solvent is continuously caused to flow, said solvent being such that it selectively dissolves diolefines, does not form azeotropic mixtures with the hydrocarbons, and is stable upon prolonged boiling.

2. A process for separating and recovering diolefine, olefine, and paraffin hydrocarbons from a mixture of hydrocarbons having similar boiling points, which comprises distilling the mixture through a fractionating column down which a liquid organic solvent is continuously caused to flow, said solvent being such that it does not form azeotropic mixtures with the hydrocarbons, and which is entirely miscible with benzene and water.

3. A process for separating and recovering diolefine, olefine, and paraffin hydrocarbons from a mixture of hydrocarbons having similar boiling points, which comprises distilling the mixture through a fractionating column down which an organic solvent of the group consisting of dioxane, bis-beta-cloroethyl ether, nitrobenzene and ethylene dichloride is continuously caused to flow.

4. A process for separating and recovering butadiene, butylenes and butanes from their mixtures, which comprises distilling the mixture through a fractionating column down which dioxane is continuously caused to flow.

5. A process for separating mixtures of diolefine, olefine and paraffin hydrocarbons into two fractions, one of which contains one component of said mixture substantially free from the other components, which comprises introducing the hydrocarbon mixture into a main fractionating column provided with a dephlegmator at its upper end and with a heating kettle at its lower end and connected to a point near its lower end and above said kettle to an auxiliary fractionating column provided with a dephlegmator at its upper end, introducing a liquid organic solvent into said main column at a point above the hydrocarbon inlet and below the dephlegmator, removing the component of said mixture which is the least soluble in said solvent from the dephlegmator on the main column as a gas free from solvent vapor, removing the component of said mixture which is more soluble in said solvent from the dephlegmator on said auxiliary column as a gas free from solvent vapor, and removing the solvent free from hydrocarbons from said heating kettle, said solvent being such that it selectively dissolves diolefines, does not form azeotropic mixtures with the hydrocarbons, and is stable upon prolonged boiling.

6. A process for separating mixtures of diolefine, olefine and paraffin hydrocarbons into two fractions, one of which contains one component of said mixture substantially free from the other components, which comprises introducing the hydrocarbon mixture into a main fractionating column provided with a dephlegmator at its upper end and with a heating kettle at its lower end and connected at a point near its lower end above said kettle to an auxiliary fractionating column provided with a dephlegmator at its upper end, introducing a liquid organic solvent into said main column at a point above the hydrocarbon inlet and below the dephlegmator, removing the component of said mixture which is least soluble in said solvent from the dephlegmator on the main column as a gas free from solvent vapor, removing the component of said mixture which is more soluble in said solvent from the dephlegmator on said auxiliary column as a gas free from solvent vapor, and removing the solvent free from hydrocarbons from said heating kettle, said solvent being such that it does not form azeotropic mixtures with the hydrocarbons, is stable upon prolonged boiling and which is entirely miscible with benzene and water.

7. A process for separating mixtures of diolefine, olefine and paraffin hydrocarbons into two fractions, one of which contains one component of said mixture substantially free from the other components, which comprises introducing the hydrocarbon mixture into a main fractionating column provided with a dephlegmator at its upper end and with a heating kettle at its lower end and connected at a point near its lower end and above said kettle to an auxiliary fractionating column provided with a dephlegmator at its upper end, introducing a solvent of the group consisting of dioxane, bis-beta-chloroethyl ether, nitrobenzene and ethylene dichloride into said main column at a point above the hydrocarbon inlet and below the dephlegmator, removing the component of said mixture which is least soluble in said solvent from the dephlegmator on the main column as a gas free from solvent vapor, removing the component of said mixture, which is more soluble in said solvent from the dephlegmator on said axiliary column as a gas free from solvent vapor, and removing the solvent free from hydrocarbons from said heating kettle.

8. A process for separating mixtures of diolefine, olefine and paraffin hydrocarbons into two fractions, one of which contains one component of said mixture substantially free from the other components, which comprises introducing the hydrocarbon mixture into a main fractionating column provided with a dephlegmator at its upper end and with a heating kettle at its lower end and connected at a point near its lower end above said kettle to an auxiliary fractionating column provided with a dephlegmator at its upper end, introducing dioxane into said main column at a point above the hydrocarbon inlet and below the dephlegmator, removing the component of said mixture which is least soluble in dioxane from the dephlegmator on the main column as a gas free from dioxane vapor, removing the component of said mixture which is more soluble in dioxane from the dephlegmator on said auxiliary column as a gas free from dioxane vapor, and removing the dioxane free from hydrocarbons from said heating kettle.

9. A process for separating mixtures of butadiene, butylenes and butanes into two fractions, one of which contains butadiene, substantially free from butylenes and butanes, which comprises introducing the mixture into a main fractionating column provided with a dephlegmator at its upper end and with a heating kettle at its lower end and connected at a point near its lower end above said kettle to an auxiliary fractionating column provided with dephlegmators at its upper and lower ends, introducing dioxane into said main column at a point above the hydrocarbon inlet and below the dephlegmator, removing butylenes and butanes from the dephlegmator on said main column as a gas free from dioxane vapor, removing butadiene from the upper dephlegmator on said auxiliary column as a gas free from dioxane vapor, and removing dioxane free from hydrocarbons from said heating kettle.

CHARLES O. YOUNG.
GRANVILLE A. PERKINS.